United States Patent Office 3,256,213
Patented June 14, 1966

3,256,213
PREPARATION OF CELLULAR ISOCYANATE-
POLYAMINO COMPOUND REACTION
PRODUCTS
George T. Gmitter, Akron, and Edwin M. Maxey, Stow,
Ohio, assignors to The General Tire & Rubber Company, a corporation of Ohio
No Drawing. Filed May 31, 1962, Ser. No. 198,765
5 Claims. (Cl. 260—2.5)

This invention relates to novel cellular isocyanate reaction products and to a process for their production. More particularly, this invention relates to cellular isocyanate reaction products produced from compositions having as one of the principal reactive components in addition to the isocyanate long chain polyamino organic compounds.

In the past cellular polyurethanes (isocyanate-polyether polyol reaction products) have been produced by reacting a nonlinear slightly branched polyether glycols or polyols with a diisocyanate or by reacting a linear polyether glycol with a mixture of di- and tri-isocyanate and/or polyisocyanate together with water, and organic tertiary amine catalyst, an organometallic catalyst, and a surfactant or foam stabilizer. In this method a large excess of the isocynates was necessary for reaction with the water present, to form carbon dioxide and to help raise the heat of reaction in order to obtain satisfactory cures.

It has been suggested heretofore that a blowing agent such as fluorocarbons (for example, "Freon" 11) can be admixed into compositions comprising polyisocyanates and polyether polyols together with various surfactants and various catalysts whereby the amount of the isocyanate necessary to react with the water to form carbon dioxide can be reduced. This method was deficient in that the bowling required a substantial amount of the heat of reaction to vaporize the fluorocarbon and therefore hindered the obtaining of a properly cured product and suitable properties in the cellular product.

It is an object of this invention to produce cellular isocyanate reaction products wherein the amount of water and the amount of the polyisocyanate required is substantially reduced, while obtaining cured cellular products with improved properties over the cellular polyether-polyurethanes heretofore produced.

It is also an object of this invention to produce cellular isocyanate reaction products which have better flexing-fatigue resistance than the cellular polyether polyurethanes heretofore produced.

It is a further object of this invention to produce cellular isocyanate reaction products which have excellent load bearing properties.

This invention also contemplates novel processes for the production of cellular isocyanate reaction products.

These and other objects and advantages will become more apparent to those skilled in the art from the following detailed description and examples.

In accordance with the present invention, it has been discovered that by substituting a long chain polyamino organic compound (hereinafter referred to as polyamino compounds) wherein the amino groups are all substantially terminal amino groups and having a molecular weight of from 500 to about 6,000, said polyamino compounds being substantially free of groups other than amino groups which are reactive with isocyanato groups, for all or part of the polyether glycol and polyol reactants heretofore employed in producing cellular polyether-polyurethanes, that the amount of the isocyanate and water employed in producing cellular isocyanate reaction products can be substantially reduced, or the water and excess isocyanate completely eliminated where a blowing agent is employed.

While complete replacement of the polyalkylene ether glycols or polyols by a long chain di- or polyamino organic compound is possible, it has been found that the reaction with the polyamino compound is almost instantaneous and the good mixing necessary to produce a cellular product is obtained only with difficulty. It has been found that one way that this difficulty can be eliminated is by forming a salt of the polyamino compound. The salt of the polyamino compound can then be thoroughly admixed with the isocyanate reactants, catalysts, surface active agents and the like without permature reaction of said polyamino compound and said isocyanate. To this mixture is then added a basic material such as calcium oxide, tertiary amines, and the like to neutralize the salt and the reaction proceeds rapidly to completion to form the cellular isocyanate reaction product.

One embodiment of the present invention comprises forming a mixture comprising of from 5 to 100 parts by weight of a polyamino compound substantially free of groups other than the amino groups which are reactive with isocyanato groups and having a molecular weight of from 500 to about 6,000 and from 0 to 95 parts by weight of a polyalkylene ether polyol having a molecular weight of from about 600 to about 6,000 and a blowing agent such as fluorocarbons or additional carbon dioxide over that necessary to substantially inactivate the polyamino compound (at pressures of from atmospheric to about 250 p.s.i.g.). To this mixture there is then added a polyisocyanate or mixture of polyisocyanates in amounts such that there is at least one isocyanato group present to react with each amino group and hydroxyl group present and preferably a slight excess of the isocyanato groups over that necesary to react with each amino and hydroxyl group present. In a case where water is also present in the reaction mixture, additional polyisocyanate sufficient to react with such water should be employed. When a blowing agent other than carbon dioxide is employed and the diamino compound is not inactivated as a salt, the polyisocyanate is added under such conditions to insure extremely rapid and intimate mixing of the isocyanate and polyamino-polyakylene ether polyol blowing agent mixture, such as is usually not possible using a mechanical agitator, for example, by the use of impingement mixers, in which high velocity streams of the reactants are impinged on each other in a very small chamber or in the air, no mechanical agitator being used. The essential feature is very rapid blending, only small quantities of the blended reactants being present in the mixer at any time. Such mixers are known and used commercially. Where the polyamino compound is not inactivated, the use of standard mixing apparatus which has a large mixing chamber incorporating an agitator, inferior foams result since the reaction between the isocyanate and the amino group of the polyamino compound is instantaneous and is substantially complete before reaction of the hydroxyl group of the polyols and before sufficient foaming by the blowing agent has been obtained.

It has been found that when carbon dioxide is employed as the blowing agent there is a reaction between said carbon dioxide and said polyamino compound, thought to be a carbamate salt, which reduces the reactivity of the polyamino compound toward the polyisocyanate so that the mixing can be accomplished without the hereinbefore stated difficulties. In another embodiment of the invention the rate of reaction of the isocyanate and polyamino compound can be substantially reduced by forming an essentially anhydrous salt of the amino group of said polyamino compound with an acid such as hydrochloric, sulfuric, acetic, phosphoric, propionic, stearic, and the like. In these instances standard mixing equipment can be employed. In this embodiment from 5 to 100 parts by weight of the polyamino compound is treated with a sufficient amount of an acid including carbon dioxide to form the salt. This salt is then mixed with from 0 to 95 parts by weight of a polyalkylene ether polyol, a blowing agent, and the polyisocyanate. There is then added to such mixture a basic material such as calcium oxide, magnesium oxide, organic tertiary amines, and the like which reacts with the amine salt to yield the free amine which then reacts with the isocyanate to produce the cellular polyurethanes of this invention. In a continuous process the basic material can be added to part of the polyol and the amino salt, polyol, blowing agent and isocyanate added and mixed simultaneously. When a basic inorganic material is used, the resultant inorganic salt formed by the reaction between the basic compound and the acid moiety of the amine salt can serve as a reinforcing filler in the finished cellular product.

The polyamino organic compound and the salts thereof which are useful in producing the compositions of this invention are those having molecular weights of from 500 to about 6,000 and which are free of groups other than the amino groups which will react with the isocyanato groups of the isocyanates and wherein the amino groups are all substantially terminal groups. Included in these polyamino organic compounds are the polyalkylene ethers terminated with primary or secondary amino groups, the amino esters of hydroxy terminated polyalkylene ethers, the di(amino esters) of hydroxy terminated long chain aliphatic hydrocarbons derived from polydienes such as polybutadiene, polyisoprene and the like; and the polydiene diamines having substantially terminal amino groups and hydrogenated polydiene diamines which may or may not contain residual ethylenic double bonds in the molecules.

The amino terminal polyalkylene ethers which are useful in the compositions of this invention are those having the general formula

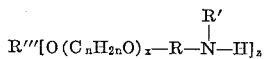

wherein R is an alkylene radical having from 2 to 10 carbon atoms, R' is hydrogen or an alkyl or aryl group such as methyl, ethyl, propyl, octodecyl, phenyl, tolyl, phenylethyl and the like; R''' is a di-, tri- or tetra-valent organic moiety derived from a polyhydroxy organic compound, for example, diols such as ethylene glycol, propylene glycol, butylene glycol and the like; the triols such as glycerol, hexane triol and the like and the tetrol such as pentaerythritol and the like; $n$ is an integer of from 2 to 10, preferably from 2 to 4, $x$ is an integer such that the molecular weight of the diamine falls within the above-defined limits, and $z$ is an integer of from 2 to 4 and is equal to the combining valence of R'''.

Illustrative of the amino esters of the polyalkylene ethers are those having the general formula

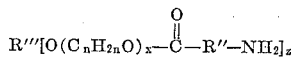

where R''', $n$, $x$, and $z$ are as above-defined and R'' is an alkylene group such as propylene, butylene and the like; or an aryl group such as phenylene, tolylene and the like.

Illustrative of the di(amino esters) of hydroxy terminated long chain aliphatic hydrocarbon derived from polydienes are those having the general formula

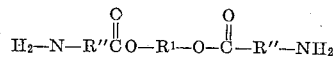

wherein R'' is as above defined and $R^1$ is a polydiene moiety or a hydrogenated polydiene moiety which may or may not contain some ethylenic double bonds and having a molecular weight of from 500 to about 6,000.

Illustrative of the polydiene diamines having substantially terminal amino groups and the hydrogenated polydiene diamines are those having the general formula

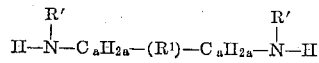

wherein $R^1$ and R' are as above defined and $a$ is an integer having a value of 2.

The isocyanates employed in the compositions of this invention are polyisocyanates having 2, 3 or more reactive isocyanate groups. Examples of these isocyanates are hexamethylene, tolylene 2,4-, tolylene 2,6-, diphenyl methane, metaphenylene, p-phenylene, 1,5-naphthalene, di(methylphenyl) methane, durene-, bitolylene-, diisocyanates and the like and mixtures thereof, such as an 80-20 mixture of 2,4- and 2,6-tolylene diisocyanates or a 65-35 mixture of 2,4- and 2,6-tolylene diisocyanates, naphthalene triisocyanates or other polyisocyanates. Another useful isocyanate is "PAPI" (The Carwin Co., North Haven, Conn.) having the general formula

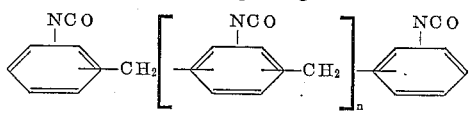

where $n$ has an average value of about 1. Mixtures of polyisocyanates can also be employed.

Prepolymers prepared by the reaction of an excess of an organic diisocyanate with a glycol, glycerol, polyether polyol, and the like which have residual isocyanato groups are also useful in preparing the novel cellular isocyanate reaction products of this invention.

The compositions of this invention which contain no hydroxyl materials but have only the polyamino organic compound which will react with the isocyanate do not require a catalyst. Where mixtures of the polyamino organic compound and hydroxyl containing material (i.e., polyether polyols or water), it is preferred to employ catalysts to catalyze the hydroxyl isocyanate reaction.

Catalytic materials which are known to catalyze the reaction of isocyanates with the hydroxyl groups to the polyalkylene ether polyols and water can also be employed in producing the compositions of this invention. Such catalysts are, for example, the aliphatic, aromatic, and heterocyclic tertiary amines, Lewis acid metal salts of organic acids, inorganic bases, organo-metallic compounds and the like.

The tertiary amine catalysts are, for example, N-methyl morpholine, triethylamine, diethyl ethanol amine, 4-n-amyl pyridine, trihexylamine, N,N,N',N'-tetramethylbutanediamine, 4-pyridine propanol, 2-ethanol pyridine, di (ethylene amino ethanol) adipate, di-butyl amino ethanol, N,N'-diethyl-2-methyl pipenazine and the like. These amine catalysts are generally used in an amount from about 0.05 to 2.5% by weight based on the total weight of the polyol used although other amounts may be employed. It generally is preferred to employ just the amount of amine needed to obtain the desired rate of reaction to avoid waste of the catalyst, to reduce the possiblity of deterioration of the product and to minimize the odor level.

Illustrative of the metal salts of organic acids which can be employed as catalysts in the processes and compositions of this invention are the materials containing a divalent Group II metal in combined form, e.g., as salts, salt-like compounds, complexes and the like as disclosed in the copending application of George T. Gmitter and E. Braidich, Serial Number 24,900 filed April 27, 1960, now abandoned, and the divalent group IVb metal compound described in copending application of George T. Gmitter, E. Braidich and Michael Kallaur, Serial Number 24,921 filed April 27, 1960, both of said applications being assigned to the same assignee as the present invention.

Also included as catalysts are the group IVa metal salts such as stannous octoate, stannous laurate, stannic naphthenate and the like. The organometallic compounds which are useful as catalysts are, for example, dibutyl tin dilaurate, dibenzyl tin dilaurate, dibutyl tin acetate and the like.

The blowing agents which can be employed in the compositions of this invention include carbon dioxide (either per se or as produced by the reaction of water and an isocyanate), lower molecular weight alkanes and alkenes, halogen substituted lower molecular weight alkanes, lower molecular weight dialkyl ethers, lower molecular weight alkyl ketones and the fluorocarbons and the like. Specific examples of materials which can be used are trichlorofluoromethane, di-chlorofluoromethane, di-chlorotetrafluoroethane, tri-chloro trifluoro ethane, ethyl chloride, methane, ethane, ethylene, propane, propylene, pentane, hexane, heptane, ethyl ether, diisopropyl ether, acetone, ethyl methyl ketone and the like. These blowing agents can be employed in amounts up to about 40% by weight based on the total weight of the polyamino compound-polyether polyol-polyisocyanate reactants.

The polysiloxane-oxyalkylene block copolymers which can be employed as surfactants in the composition of this invention are those having the general formula

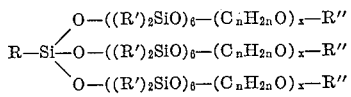

where $(C_nH_{2n}O)_x$ is a mixed polyoxyethylene-oxypropylene block containing about 17 oxyethylene and 13 oxypropylene units, R, R' and R" are alkyl groups such as methyl, ethyl, propyl, butyl and the like. The particular polysiloxane oxyalkylene block copolymer employed in the examples has as a general formula

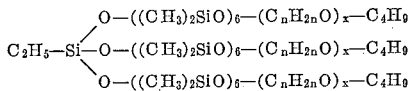

where $(C_nH_{2n}O)_x$ is a mixed polyoxyethylene-oxypropylene block containing about 17 oxyethylene and 13 oxypropylene units.

Other types of surfactants are also useful in the compositions of this invention. Such surfactants of the anionic and cationic types are known in the art.

Other compounding ingredients may be employed in producing the cellular polyisocyanate reaction products of this invention, for example, wetting agents, emulsifiers, fillers, pigments and dyes, anti-degradants, plasticizers, anti-oxidants and fire resistant additives such as antimony oxide and the like.

Illustrative of the fillers which can be employed in the compositions of this invention are carbon black, talc, silica, titanium dioxide, mica, wood pulp and the like.

Small amounts of water may be employed in the compositions of this invention to facilitate blowing. The water reacts with the isocyanate to produce carbon dioxide which acts as the blowing agent. In general, when water is employed in the compositions of this invention it is preferred that it be employed in amounts of less than two parts by weight per 100 parts by weight of the combined polyamino organic compound and the polyalkylene ether polyol employed. Higher amounts of water can, of course, be employed. However, no commensurate advantages are obtained thereby and this also increases the amount of the isocyanate which must be used.

The polyether polyols employed in the practice of the present invention may be obtained from alkylene oxides, substituted oxetanes, glycols, heterocyclic ethers and others materials by polymerization, copolymerization and the like. For example, tetrahydrofuran may be polymerized in the presence of catalytic amounts of fluorosulfonic acid to make polytetramethylene ether polyol having the formula $$HO(-CH_2-CH_2-CH_2-CH_2-O-)_nH$$

where $n$ is an integer. Glycols may also be polymerized in the presence of mineral acids, sulfonic acid or fuller's earth. Still other methods well known to those skilled in the art may be utilized in the preparation of these polyalkylene ether polyols. The linear polyalkylene ether polyols have at least three carbon atoms in their alkylene groups and can have as high as 8 or more carbon atoms in their alkylene groups. Useful examples of polyether polyols are polypropylene ether glycol, polyethylene-ether-propylene ether glycol, polytetramethylene ether glycol, polypentamethylene ether glycol, polyhexamethylene ether glycol, poly-1,6-octamethylene ether glycol and the like and mixtures thereof.

Branch chain polyether polyols may be obtained by reacting glycols or alkylene oxides or mixtures thereof and the like with materials such as sucrose, sorbitol, styrene-vinyl alcohol copolymers, hexanetriol, pentaerythritol, glycerol, phloroglucinol, trimethylol phenol, trimethylol benzene, trimethylol propane and the like in the presence of suitable catalysts. In making flexible materials it is preferred to employ the high molecular weight polyols, i.e., polyether polyols having an average molecular weight of from about 600 to 6,000 and from 2 to 4 reactive hydroxyl groups.

The polyamino organic compound employed in the composition of this invention are produced according to the following procedures:

CYANO ETHYLATION OF POLYPROPYLENE GLYCOL

A mixture of 89 grams (1.68 moles) of acrylonitrile, 310 grams (0.73 mole) of a polypropylene glycol having an average molecular weight of 425 and 2 grams of 20% potassium hydroxide in diethylene glycol was allowed to react keeping the temperature below 60° C. by means of external cooling. Reaction was complete in about one hour. About 5 cc. of diluted hydrochloric acid were added to neutralize the catalyst. The above product was added to a hydrogenation bomb provided with agitation, 306 grams of acetic anhydride, 35 grams of wet Raney nickel catalyst and 50 grams of anhydrous sodium acetate were also added to the bomb. The bomb was then charged with 200 pounds of hydrogen at 30° C. The temperature ranged slightly above this during the first hour of operation and within the last two hours rose to slightly over 50° C.; the hydrogen pressure meanwhile dropped. After three hours the product was removed from the bomb and filtered to remove catalyst. The acetic anhydride was then stripped under vacuum. The product was then placed in a 2-liter flask with 500 grams of 20% potassium hydroxide in methanol. After standing at room temperature for 24 hours, the product was neutralized with hydrochloric acid. The water and volatiles were removed by vacuum stripping at 3 mm. pressure and 210° C. The residue (378 grams) was charged to the molecular still. The following fractions were obtained:

| Fraction | (Cc.) Volume | Temp., °C. | Pressure, microns | $n_D^{24°}$ |
|---|---|---|---|---|
| 1 | 4 | to 85 | 7 | 1.4464 |
| 2 | 19 | 106 | 4 | 1.4490 |
| 3 | 22 | 109 | 3 | 1.4490 |
| 4 | 34 | 125 | 2 | 1.4492 |
| 5 | 100 | 143 | 2 | 1.4499 |
| 6 | 100 | 155 | 2 | 1.4503 |
| 7 | 32 | 160 | 2 | 1.4507 |
| Residue | 56 | | | |

Fractions 2 through 5 were combined and titrated with perchloric acid. Product assayed 97% diamine assuming a molecular weight of 539.

CYANO ETHYLATION OF POLYTETRAMETHYLENE ETHER GLYGOL

A solution of 5 grams of potassium hydroxide in 2.350 grams (2.42 moles) of polytetramethylene ether glycol (about 970 molecular weight) was made by warming to 80° C. for two hours with agitation. This solution was then cooled to 33° C. and 283 grams (5.35 moles) of acrylonitrile were added in increments during a period of two hours. The temperature rose to 49° C. and the mix was allowed to stand at ambient temperature over the next 48 hours. The reaction product was then neutralized by the addition of ten grams of concentrated HCl. The above product (530 grams) was added to a hydrogenation bomb provided with agitation. Acetic anhydride (306 grams), 35 grams of wet Raney nickel catalyst and 50 grams of anhydrous sodium acetate were also added to the bomb. The bomb was then charged with 200 pounds of hydrogen at 30° C. The temperature ranged slightly above this during the first hour of operation and within the last 2 hours rose to slightly over 50° C., the hydrogen pressure meanwhile dropping to 125 pounds. After three hours the product was removed from the bomb and filtered to remove catalyst. The acetic anhydride was then stripped under vacuum. The product (470 grams) was then placed in a 2 liter flask with 500 grams of 20% potassium hydroxide in methanol. After standing at room temperature for 24 hours, the product was neutralized with hydrochloric acid. Additional diethyl ether was added to keep the product in solution. After neutralization the product in solvent was passed through an ion exchange column. The solvents were then removed by distillation under mild vacuum. Product as residue was clear, light tan in color and tirtated 94% pure using one-tenth normal perchloric acid in acetic acid assuming a molecular weight of 1086 for the diamine product.

In a similar reaction as hereinabove set forth, acrylonitrile was added to the hydroxyls of a polypropylene ether triol of 3000 molecular weight. This triol was prepared by the base catalyzed condensation of propylene oxide to glycerol. This nitrile adduct after hydrogenation and subsequent clean up procedures showed the following analyses:

Primary amine _____milliequivalent/gram__ 0.825
Secondary amine _____do____ 0.020

Likewise, a polypropylene-ethylene ether triol of some 4000 molecular weight (prepared by the base catalyzed condensation of propylene oxide with 1,2,6-hexanetriol with subsequent condensation of this product with ethylene oxide to convert the majority of secondary hydroxyl end groups to primary hydroxyl end groups) was treated with a 10% excess of acrylonitrile beyond the 3:1 molar ratio of acrylonitrile needed to react with the above triol. After subsequent hydrogenation and clean up, the product gave the following analyses:

Primary amine _____milliequivalent/gram__ 0.785
Secondary amine _____do____ 0.024

Another method of preparing the amino terminated starting materials employed in the process of the invention is as follows:

One mole (966 grams) of polytetramethylene ether glycol, 445 grams (2.4 moles) of p-nitrobenzoylchloride and 395 grams (5 moles) of pyridine were weighed into a 5 liter flask equipped with stirrer, reflux condenser and thermometer. When the exotherm was dissipated, the reaction mixture was heated to reflux for one-half hour. It was then cooled to 30° C. and neutralized with about 1500 cc. of 10% sodium carbonate until carbon dioxide evolution stopped, keeping the temperature during the addition of carbonate below 30° C. Agitation was then stopped and the phases allowed to separate. The water layer was decanted off and the organic layer washed with water. The water and pyridine were then stripped from the organic layer by distillation. The product after solvent removal was a light brown viscous liquid. Yield was 1205 grams, 95% based on the glycol used.

*Analysis.*—Nitrogen found—2.0 percent; theoretical—2.2 percent. Saponification number found—90; theoretical—89.

The product was then placed in dioxane to complete solution and 3% of Raney nickel catalyst added to the solution. The mixture was placed in a hydrogenation bomb and the product subjected to 1800 pounds per square inch of hydrogen pressure for the reduction. The product was then subject to filtration for removal of the catalyst and the dioxane stripped under 1 mm. pressure at slightly above room temperature. The residue was titrated with perchloric acid for assay. The sample weighing 1.349 grams required 23 cc. of .096 N perchloric acid using a methyl violet end point. This calculated as 99% pure diamine assuming a molecular weight of 1210.

A diamine of the type

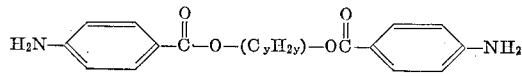

where y is an integer of 35 or greater, was prepared by charging a hydroxy terminated polybutadiene (molecular weight 1340), p-nitrobenzoyl chloride (0.4 moles), pyridine (0.4 moles) and 200 cc. of benzene into a one liter round bottom flask or agitated at room temperatures. The heat of reaction raised the temperature to a maximum of 65° C. After reaching 65° C., the mixture was agitated for an additional one hour. 270 cc. of a 10% solution of sodium carbonate in water were then added. When the carbon dioxide evolution had ceased, the product was transferred to a separatory funnel and 250 cc. of benzene added. After extraction, the benzene layer was separated, washed twice with 100 cc. portions of 20% sodium chloride in water, dried over anhydrous magnesium sulfate overnight, filtered and stripped of benzene and pyridine. The weight of stripped product was 196 grams. The stripped product was diluted with 200 cc. of dioxane and subjected to hydrogenation using 3% Raney nickel as the catalyst and hydrogen at 1800 p.s.i.g. The hydrogenated solution was filtered to remove the Raney nickel catalyst and the dioxane was then removed by vacuum stripping at 110° C. and 6 mm., Hg. The product was a light reddish brown biscous material and analyzed to be 70% by weight of a diamine of 1578 molecular weight.

The polydiene having substantially primary or secondary amine end group functionality and having molecular weights from about 500 to about 6,000, for example, polybutadiene having $NH_2$ or $NHR'$ end group functionality, can be prepared by the addition of the following type reactants

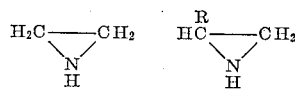

to dimetallo-polydiene intermediates following procedures related to those described in United States Patent 2,352,-461 and United States Patent 2,816,916 wherein the low molecular weight diacids from butadiene using sodium metal as initiator are prepared by the addition of carbon dioxide to the disodium adduct of polybutadiene.

The hydrogenation of any of the resulting polydiene diamines with standard procedures will result in the preparation of polyhydrocarbons having substantially functional primary and/or secondary amine groups.

The isocyanate reaction products of this invention can also be called polyureas in the instances where the polyisocyanate is reacted only with the polyamino organic compound and polyurea-polyurethanes where the starting compositions contain the polyamino organic compounds, a polyalkylene ether polyol and the polyisocyanate.

The novel cellular isocyanate reaction products of this invention are useful as crash pads, mattresses, pillows and the like.

The following examples serve to fully illustrate this invention. In the examples all parts are by weight unless otherwise specified.

*Example 1*

A polyether propylene diamine (i.e., a polypropylene oxide, having terminal amino groups, equivalent weight 1205) (100 grams) was dissolved in acetone (50 grams) and sulfuric acid (8.1 grams) added slowly to the mixture to give the amine salt. Twenty-five grams of this solution were mixed with toluene diisocyanate (1.4 grams) (80% 2,4; 20% 2,6), calcium oxide (0.59 gram) with rapid stirring. A reaction rapidly took place and a polyurethane foam was formed which completely filled a 250 cc. container.

It is to be noted that where no calcium oxide was added no reaction was apparent; and when the diamine was mixed with the toluene diisocyanate, the reaction was so rapid that only a gelled mass was obtained.

Example 2

A flexible polyether-polyurethane type foam was prepared having the following composition:

| Ingredients: | Parts by weight |
|---|---|
| Union Carbide LG56 Triol (a polypropylene oxide adduct of glycerol, hydroxyl No. 56) | 100 |
| PPG 1025 Diamine L-3 (a polypropylene oxide, having terminal amino groups, equivalent weight 1205 and a molecular weight of 2410 | 15 |
| N,N,N',N'-tetramethylbutane diamine-1,3 | 0.1 |
| N-methyl morpholine | 0.6 |
| Water | 1.3 |
| Antara Igepal CO630 (a non-ionic wetting agent) | 1.0 |
| Polyalkylene oxide polysiloxane block copolymer | 1.0 |
| Stannous octoate | 0.28 |
| Carbon dioxide | 1.0 |
| Toluene diisocyanate (80/20 mixture of 2,4- and 2,6-toluene diisocyanate) | 24.5 |

The above ingredients were introduced into the nozzle of a foaming machine at a head pressure of 100 p.s.i.g., where the ingredients were thoroughly mixed and issued from the nozzle as a froth into a pan where further foaming occurred. After the foam had risen to its full height during a 2 or 3 minute period, it was heated to 100° C. for one hour. Thereafter, the flexible foam product was crushed by passing through rollers having a clearance of about 10–40% of the thickness of the foam to thereby produce an essentially 100% open cell structure. The foamed material had the following properties:

| Loads | Instantaneous | 1 Minute RMA |
|---|---|---|
| 5% | 8.0 | 7.5 |
| 10% | 11.0 | 10.0 |
| 25% | 14.0 | 13.0 |
| 50% | 20.5 | 19.0 |
| 65% | 30.0 | 27.5 |
| 75% | 51.0 | 45.5 |

Example 3

In a subsequent run according to the procedure of Example 2, the amount of the diamine was increased to 25 parts by weight while the amount of toluene diisocyanate was decreased to 18.4 parts by weight, and water to 0.9 part by weight. The flexible foamed product thus produced had a density of 1.65 pounds.

Example 4

A flexible polyether-polyurethane type foam was prepared having the following composition:

| Ingredients: | Parts by weight |
|---|---|
| Union Carbide LG56 Triol (a polypropylene oxide adduct of glycerol, hydroxyl No. 56) | 100 |
| L-3 diamine (a polypropylene oxide, having terminal amino groups, equivalent weight 1205) | 35 |
| Polyalkylene oxide polysiloxane block copolymer | 2.0 |
| Stannous octoate | 0.3 |
| N-methyl morpholine | 1.0 |
| N,N,N',N' - tetramethylbutanediamine-1,3 | 0.1 |
| Dichlorofluoromethane | 25.0 |
| 80/20 isomer ratio 2,4–2,6-toluene diisocyanates | 23.7 |
| NCO ratio | 1.03/1.00 |

The above ingredients were introduced into the nozzle of a foaming machine at a head pressure of 5–10 p.s.i.g., where the ingredients were thoroughly mixed and issued from the nozzle into a pan where foaming occurred. After the foam had risen to its full height during a 2 or 3 minute period, it was heated to 100° C. for one hour. Thereafter, the flexible foam product was crushed by passing through rollers having a clearance of about 10–40% of the thickness oft he foam, to thereby produce an essentially 100% open cell structure. The foamed material had the following properties:

| | |
|---|---|
| Density lbs./cu. ft. | 2.10 |
| Resilience percent | 31 |
| Tensile p.s.i | 3.9 |
| Tear p.l.i | 0.7 |
| Percent elongation | 75.0 |

COMPRESSION/DEFLECTION RMA

| Percent deflection: | |
|---|---|
| 5 | 1.75 |
| 10 | 3.50 |
| 25 | 8.00 |
| 50 | 15.00 |
| 65 | 23.00 |
| 75 | 30.00 |

Example 5

A flexible polyether-polyurethane type foam was prepared having the following composition:

| Ingredients: | Parts by weight |
|---|---|
| Union Carbide LG56 Triol (a polypropylene oxide adduct of glycerol, hydroxyl No. 56) | 100 |
| L-3 diamine (a polypropylene oxide, having terminal amino groups, equivalent weight 1205) | 35 |
| Polyalkylene oxide polysiloxane block copolymer | 1.8 |
| Triethylene diamine | 0.3 |
| N,N,N',N' - tetramethylenebutanediamine-1,3 | 0.2 |
| Zinc octoate | 1.0 |
| Dichloromonofluoromethane | 25.0 |
| N-methyl morpholine | 0.6 |
| 80/20 isomer ratio 2,4–2,6 toluene diisocyanates | 31.4 |
| Water | 1.4 |

The above components were hand mixed in paper containers employing a lobartory air stirrer. After the foam had risen to its full height during a 2 or 3 minute period, it was heated to 100° C. for one hour. Thereafter, the flexible foam product was crushed by passing through rollers having a clearance of about 10–40% of the thickness of the foam, to thereby produce an essentially 100% open cell structure. The foamed material had the following properties:

| | |
|---|---|
| Density lbs./cu. ft. | 2.0 |
| Schopper resilience | 34.0 |

Example 6

According to the procedure of Example 5, Dow 112-3, an ethylene oxide capped polypropylene ether triol of molecular weight 3000 in place of LG56. The foamed material had the following properties:

| | |
|---|---|
| Density lbs./cu. ft. | 1.85 |
| Schopper resilience | 34.0 |

Example 7

A flexible polyether-polurethane type foam was prepared having the following composition:

| Ingredients: | Parts by weight |
|---|---|
| Union Carbide LG56 Triol (a polypropylene oxide adduct of glycerol, hydroxyl No. 56) | 100.0 |
| LHT 35 triamine (a polypropylene oxide adduct of 1,2,6-hexanetriol having three terminal amino groups) (approximately 4800 molecular weight) | 35.0 |
| Stannous octoate | 0.5 |
| Polyalkylene oxide polysiloxane block copolymer | 1.5 |
| N,N,N',N'-tetramethylbutanediamine | 0.1 |
| N-methyl morpholine | 0.6 |
| Water | 1.8 |
| 80/20 isomer ratio toluene diisocyanate | 31.2 |
| Dichloromonofluoromethane | 40.0 |
| Atomite grade of calcium carbonate | 50.0 |

The above components were hand mixed in paper containers employing a laboratory air stirrer. After the foam had risen to its full height during a 2 or 3 minute period, it was heated to 100° C. for one hour. Thereafter, the flexible foam product was crushed by passing through rollers having a clearance of about 10-40% of the thickness of the foam, to thereby proudce an essentially 100% open cell structure. The foam then had a density of 1.9 lbs./cu. ft.

Example 8

A flexible polyether-polyurethane foam was prepared having the following composition:

Ingredients:
| L-3 diamine (a polypropylene oxide, having terminal amino groups, equivalent weight 1205) | grams | 100 |
|---|---|---|
| Acetone | cc | 50 |
| Concentrated hydrogen sulfuric acid | grams | 8.3 |

The 100 grams of L-3 diamine were dissolved in 50 cc. of acetone and 8.3 grams of concentrated sulfuric acid added to the mixture. During the addition of the sulfuric acid the temperature rose approximately 24° F. 150 grams of the above reaction mixture and 8.9 grams of toluene diisocyanate were mixed. No reaction occurred; to this mixture was added 3 grams of calcium oxide whereupon the mixture immediately foamed to yield a polyurethane foam having a density of 3.7 pounds per cubic foot.

Example 9

A flexible polyether-polyurethane type foam was prepared having the following composition:

| Ingredients: | Parts by weight |
|---|---|
| Union Carbide LG56 triol, (a polypropylene oxide adduct of glycerol, hydroxyl No. 56) | 100.0 |
| Polyalkylene oxide polysiloxane block copolymer | 1.80 |
| Stannous octoate | 0.40 |
| Union Carbide L-11 triamine (LG56 triamine, a polypropylene oxide adduct of glycerol having terminal amino groups and a molecular weight of 3150) | 21.30 |
| Water | 1.80 |
| N,N,N',N'-tetramethylbutanediamine | 0.075 |
| N-methyl morpholine | 0.60 |
| 65/35 ratio 2,4-,2,6-toluene diisocyanate | 31.20 |
| Freon-11 (dichloromonofluoromethane) | 20.00 |

The above ingredients were introduced into the nozzle of a foaming machine at a head pressure of 5-10 p.s.i.g., where the ingredients were thoroughly mixed and issued from the nozzle into a pan where foaming occurred. After the foam had risen to its full height during a 2 or 3 minute period, it was heated to 100° C. for one hour. Thereafter, the flexible foam product was crushed by passing through rollers having a clearance of about 10-40% of the thickness of the foam, to thereby produce an essentially 100% open cell structure. The foamed material had the following properties:

| Density | lb./cu. ft. | 2.15 |
|---|---|---|
| Rebound | percent | 61.0 |
| 25% comp. def. | | 3.5 |
| 90% compression set | | 7.6 |

Example 10

A flexible polyether-polyurethane type foam was prepared having the following composition:

| Ingredients: | Parts by weight |
|---|---|
| Union Carbine LG56 triol (a polypropylene oxide adduct of glycerol, hydroxyl No. 56) | 100.0 |
| Polyalkylene oxide polysiloxane block copolymer | 1.60 |
| Stannous octoate | 0.40 |
| Carbide L-3 diamine (a polypropylene oxide, having terminal amino groups, equivalent weight 1205) | 27.20 |
| Water | 1.75 |
| Tetramethylbutanediamine | 0.075 |
| N-methyl morpholine | 0.60 |
| 80/20 toluene diisocyanate | 31.20 |
| Freon-11 (dichloromonofluoromethane) | 10.0 |

The above ingredients were introduced into the nozzle of a foaming machine at a head pressure of 5-10 p.s.i.g., where the ingredients were thoroughly mixed and issued from the nozzle into a pan where foaming occurred. After the foam had risen to its full height during a 2 or 3 minute period, it was heated to 100° C. for one hour. Thereafter, the flexible foam product was crushed by passing through rollers having a clearance of about 10-40% of the thickness of the foam, to thereby produce an essentially 100% open cell structure. The foamed material had the following properties:

| Density | lb./cu. ft. | 2.92 |
|---|---|---|
| Percent rebound | | 57 |
| 25% comp. def. | | 4.2 |
| Tensile | | 3.8 |
| Tear | | 0.6 |
| Percent elongation | | 80 |
| 90% set | | 5.2 |

Example 11

A flexible polyether-polyurethane type foam was prepared having the following composition:

| Ingredients: | Parts by weight |
|---|---|
| Union Carbide LG56 triol (a polypropylene oxide adduct of glycerol, hydroxyl No. 56) | 75 |
| P-diamino benzoate ester of polybutadiene glycol | 25 |
| Polysiloxane-oxyalkylene block polymer | 1.0 |
| Stannous octoate | 0.3 |
| Dichloromonofluoromethane | 10.0 |
| N-methyl morpholine | 0.25 |
| N,N,N',N'-tetramethylbutanediamine | 0.03 |
| Water | 1.72 |
| 80/20 isomer ratio 2,4-2,6-toluene diisocyanate | 24.50 |

The ingredients were mixed in a one-half gallon container using an air driven laboratory stirrer, after foaming took place, cured two hours at 250° F. There resulted a foam having the following properties:

| Density | lb./cu. ft. | 1.35 |
|---|---|---|
| Schopper resilience | percent | 38 |

A similar foam was made using 50 parts of the polybutadiene diamine and reducing the propylene triol (LG56) to 50 parts. This foam had a density of 1.45 lbs./cu. ft.

*Example 12*

Twenty-five grams of a triamine made from a polypropylene triol of 3,000 molecular weight and 10 grams of Freon 11 were reacted with carbon dioxide at 120 p.s.i. with agitation for one hour. The mixture was cooled under this pressure to 15° C. and brought to atmospheric pressure.

To this were added 1.2 grams of calcium oxide, 5 grams of finely divided calcium carbonate, and 0.25 gram of a polysiloxane-oxyalkylene block copolymer. These components were then dispersed. 2.3 grams of 80/20 2,4–2,6 isomer ratio toluene diisocyanate were then added and mixed in. After a short inhibition period, reaction and foaming occurred to give a stable foam which after further cure, two hours at 250° F., was tough, flexible and resilient.

Having thus described our invention, what is claimed is:

1. A process for the production of cellular isocyanate reaction products which comprises forming a mixture of (1) at least one organic polyisocyanate with (2) a member of the class consisting of the inorganic acid salts and organic acid salts of an organic polyamine selected from the class consisting of amine terminated polyalkylene ethers, amino esters of hydroxy terminated polyalkylene ethers, the di-(amino esters) of hydroxy terminated long chain aliphatic hydrocarbons, the polydiene diamines and hydrogenated polydiene diamines, said amine termination being primary and secondary amine termination, said salts having a molecular weight of from 500 to 6,000 and being free of groups other than amine groups which react with isocyanato groups and (3) a blowing agent and subsequently admixing therewith a basic material which reacts with said salt to form the free amine and allowing the admixture to react to produce said cellular isocyanate reaction products.

2. A process as claimed in claim 1 wherein said acid salt is a sulfuric acid salt and said basic material is calcium oxide.

3. A process as claimed in claim 1 wherein the mixture also contains a polysiloxane oxyalkylene block copolymer.

4. A process for the production of cellular isocyanate reaction products which comprises (1) reacting a member of the class consisting of primary and secondary amine terminated organic polyamine selected from the class consisting of amine terminated polyalkylene ethers, amino esters of hydroxy terminated polyalkylene ethers, the di-(amino esters) of hydroxy terminated long chain aliphatic hydrocarbons, the polydiene diamines and hydrogenated polydiene diamines with carbon dioxide under pressure to yield a salt and thereafter admixing said salt with (2) at least one organic polyisocyanate, (3) a blowing agent, and (4) a basic material which reacts with said salt to form the free amine and allowing said admixture to react to produce said cellular isocyanate reaction products 5. A process as claimed in claim 4 wherein said basic material is calcium carbonate.

References Cited by the Examiner

UNITED STATES PATENTS

| | | | |
|---|---|---|---|
| 2,842,506 | 7/1958 | Roussel | 260—2.5 |
| 2,866,722 | 12/1958 | Gensel | 260—2.5 |
| 3,044,989 | 7/1962 | Shivers | 260—77.5 |
| 3,047,540 | 7/1962 | Merten et al. | 200—2.5 |
| 3,070,556 | 12/1962 | Merten et al. | 200—2.5 |
| 3,094,494 | 6/1963 | Hopkins et al. | 200—2.5 |
| 3,179,606 | 4/1965 | Prescott | 260—2.5 |

LEON J. BERCOVITZ, *Primary Examiner.*

D. E. CZAJA *Assistant Examiner.*